March 12, 1957　　S. LANGBERG ET AL　　2,785,317
AUTOMATIC CHANGEOVER APPARATUS
Filed June 25, 1954　　3 Sheets-Sheet 1

INVENTORS.
SAMUEL LANGBERG
JOSEPH E. COHEN
BEN E. GUMPERTZ
BY THEIR ATTORNEYS.
HARRIS, KIECH, FOSTER & HARRIS

United States Patent Office 2,785,317
Patented Mar. 12, 1957

2,785,317

AUTOMATIC CHANGEOVER APPARATUS

Samuel Langberg, Burbank, and Joseph E. Cohen and Ben E. Gumpertz, Van Nuys, Calif., assignors to Dispensers, Inc., Los Angeles, Calif., a corporation of California Application June 25, 1954, Serial No. 439,402

22 Claims. (Cl. 307—64)

This invention relates to an automatic changeover apparatus designed to be utilized in conjunction with a plurality of potential sources and to determine aberrations occurring in the potential at the output of any one of the sources. Furthermore, the automatic changeover apparatus of our invention can automatically cause a shift of load from one potential source to another when the apparatus has detected an aberration in the output of a functioning source from a predetermined norm or norms.

In order to facilitate the disclosure of the automatic changeover apparatus of our invention, we will describe it hereinbelow as utilized in conjunction with a pair of inverters designed to convert 28 v. D. C. to 400 cycle, 115 v. A. C. Nevertheless, it is obvious that the principles of our invention could be applied to apparatus designed to monitor other sources of potential and to automatically change over from a non-functioning to a functioning source upon the detection of aberrations from a predetermined norm or norms.

In present day aircraft, the usual source of potential is 28 v. D. C. and, since a large number of the components utilized in the aircraft will function only on A. C., it is necessary to provide an inverter or similar means for converting the D.-C. to A.-C. potential. Since the instrumentation of present day aircraft and the continued unimpeded operation thereof are critical in that the failure of the instrumentation will possibly result in the death of the personnel flying the aircraft and the destruction of the aircraft itself, it is desirable that the effects of failure at the power source be obviated. In order to cope with inverter failure, aircraft have been equipped with primary and secondary inverters so that when the primary inverter fails the secondary inverter can be voluntarily brought into operation to provide a source of potential for the A.-C. instrumentation of the aircraft.

Unfortunately, it has been discovered that the voluntary control of paired inverters is not sufficient to prevent the cessation of operation of critical instruments since, under duress and the stress of wartime conditions and particularly in combat, the personnel of the aircraft are so completely preoccupied that one of the inverters may fail and the other of the inverters not be energized. As a matter of fact, most combat aircraft, at the present time, are equipped with only one inverter because both the Armed Forces and the manufacturers have come to the conclusion that the provision of primary and secondary inverters without some means to accomplish the automatic energization and changeover from one to the other of the inverters is not efficacious to overcome the problems outline briefly above.

It is, therefore, an object of our invention to provide an automatic changeover apparatus designed to be utilized in conjunction with primary and secondary inverters and to automatically place the primary inverter in operative condition when the instruments or other components of the aircraft powered by the inverters are initially energized.

Another object of our invention is the provision of an apparatus of the aforementioned character which includes means designed, upon the initial energization of the apparatus, to automatically impose the output of a source of D.-C. potential on the primary inverter so that the primary inverter will always be initially energized.

Some of the instruments and other A.-C. powered components of the aircraft must be supplied by A. C. which does not vary between upper and lower potential limits and the initiation of operation of these instruments or components below or above certain critical limits will result in permanent damage to these instruments or components.

In order to avoid the possibility that the aforementioned instruments or components be subjected to extreme variance of potential during the initial operation of the inverters and the inverter changeover, there is included in one of the embodiments of the apparatus a time-delay circuit which automatically delays the energization of the inverter changeover and the inverters associated therewith for a period commensurate with the obtention of maximum desired output from the D.-C. source and from the inverters themselves.

Another object of our invention is the provision, in an apparatus of the aforementioned character, of means energizable simultaneously with the impressing of D.-C. potential on the primary inverter for impressing the A.-C. output of the primary inverter on the automatic changeover apparatus.

A further object of our invention is the provision, in an automatic changeover apparatus, of a sensing circuit for monitoring the output of one or the other of the inverters with which the apparatus is associated, said sensing circuit having imposed thereupon the output of one or the other of said inverters simultaneously with the impressing of the D.-C. potential on said one or the other of the inverters.

Another object of our invention is the provision, in an automatic changeover apparatus of a voltage doubler on which the output of the then functioning inverter is impressed, said voltage doubler being interposed between the output of the functioning inverter and the aforementioned sensing circuit whereby the output of said voltage doubler is impressed on said sensing circuit.

It is conventional practice in aircraft instrumentation to check out the bulk of the instrumentation prior to taking off and, since it is desirable that the personnel of the aircraft be fully apprised of the operating condition of the automatic changeover apparatus, it is necessary to incorporate therein means for simulating the failure of one or the other of the inverters associated with the changeover apparatus to determine whether the changeover apparatus will properly detect such simulated failure and change over from the inverter whose failure is simulated to its associated inverter.

Another object of our invention is the provision, in the means for impressing the output of one or the other of the inverters on the changeover apparatus, of a test switch which can alternatively be placed in circuit with one or the other of the inverters and which can be opened to prevent the output of the then functioning inverter from being imposed on the changeover apparatus, thus simulating complete failure of the inverter and causing the inverter changeover apparatus to detect and remedy the simulated failure in the same manner as it would an actual failure.

It is not desirable that an inverter having less than a predetermined minimum output be permitted to energize the A.-C. components and instrumentation of the aircraft since, as previously indicated, some of the components and instruments may be damaged by operation at extreme low voltages for even relatively short periods of time. Furthermore, if an inverter is putting out less than the rated voltage, it is probably malfunctioning and it is not desirable that a malfunctioning inverter be utilized initially as a source of potential.

It is, therefore, another object of our invention to provide, in the aforementioned sensing circuit, an initial low voltage detecting means which serves to prevent the initial utilization of a malfunctioning primary inverter if the initial voltage imposed upon the initial low voltage detecting circuit is less than a predetermined norm, in the present case approximately 102½ v. It should be noted, at the present time, that, although the embodiments of the invention are disclosed as operating at specific voltages, the various circuit elements can be adapted for use with widely different voltages and that voltage figures presented herein, while operable, are not intended to be taken in a limiting connotation.

It is obvious that the A.-C. powered components and instruments of the aircraft cannot operate effectively at lower than a minimum rated voltage and it is therefore necessary to incorporate, in the sensing circuit, a detecting circuit means for detecting a voltage drop below a minimum predetermined voltage which is less than the voltage necessary to energize the aforementioned initial low voltage detecting circuit. Thus, by our invention, we provide that the primary inverter will not be initially utilized if its output does not meet an optimum voltage requirement but, by the utilization of low voltage detecting means in conjunction with the initial low voltage detecting means, we permit the inverter to be utilized as a source of potential even though its output falls below that necessary to initially energize the extreme low voltage detecting means.

A further object of our invention is the provision, in the sensing circuit of the aforementioned apparatus, of extreme high voltage detecting means which is designed to detect departures, at the high voltage end of the inverter output, from a predetermined norm. Therefore, the burning out of A.-C. powered components and instrumentation by the imposition thereupon of abnormally high voltages is obviated.

Another object of our invention is the provision, in the aforementioned sensing circuit and, more particularly, in the low and high voltage detecting means thereof, of adjustment means designed to permit the adjustment of the low and high voltage detecting means so that the detecting means can be utilized in applications where the minimum and maximum voltage requirements differ.

A further object of our invention is the provision, in an inverter changeover apparatus, of a changeover circuit which is responsive to signals generated by the sensing circuit and which acts to automatically shift the main D.-C. source from a malfunctioning to a functioning inverter while simultaneously de-energizing said malfunctioning inverter.

Since there are momentary aberrations and fluctuations in the output of the inverters and, since it is undesirable that the changeover apparatus be energized by such momentary aberrations, there is incorporated in the changeover circuit time-delay circuit means designed to prevent the immediate energization of the changeover circuit for a predetermined period of time; in the present instance, four seconds. Therefore, if the functioning inverter upon which the main D.-C. source is impressed, and to the output of which the changeover apparatus sensing circuit is connected, momentarily malfunctions, the sensing circuit will detect such malfunction but the changeover circuit will not immediately reject the apparently malfunctioning inverter but will temporarily delay the changeover until a delay, sufficient to insure that the aberration was not merely temporary, has taken place.

Another valuable function performed by the time-delay circuit in the changeover circuit is that, when the changeover from one inverter to the other takes place, it is possible that the inverter to which the load has been transferred may momentarily malfunction with the sudden imposition of load thereupon. If the time-delay circuit were not provided in the changeover circuit, it is conceivable that the apparently malfunctioning inverter would be rejected and the changeover circuit would once again bring the initially malfunctioning inverter back into operation with the undesirable result that the changeover circuit would hunt from inverter to inverter starving the instrumentation and other A.-C. components of the aircraft despite the fact that at least one of the inverters was in properly functioning condition.

Another valuable function performed by the time-delay circuit in the changeover circuit is that the time-delay circuit, while it prevents the complete energization of the changeover circuit to bring another inverter into operation, nevertheless temporarily disconnects the apparently malfunctioning inverter from the A.-C. powered instrumentation and components of the aircraft, thus eliminating the possibility that the instrumentation and components may be subjected to voltages which will injure them if the inverter is actually malfunctioning.

Another object of our invention is the provision of an automatic changeover apparatus which can be utilized in conjunction with either multiphase or single-phase inverters, one of the embodiments of the invention described below being used with multiphase inverters and the other being designed for utilization in conjunction with single-phase inverters.

Other objects and advantages of our invention will be apparent from the following specification and the accompanying drawings, which are for the purpose of illustration only, in which.

Figure 1:
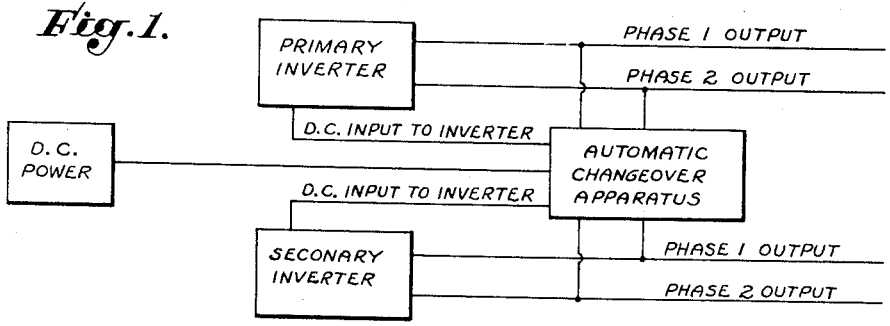
Fig. 1 is a schematic depiction of the broad relationship between the primary and secondary inverters and the automatic changeover apparatus.

Referring to the drawings, and particularly to Fig. 1 thereof, we show a main source of D.-C. potential which is applied directly to an automatic changeover apparatus constructed in accordance with our invention. Associated with the automatic changeover apparatus and designed to alternatively provide a source of A.-C. potential to the A.-C. powered instruments and other components of the aircraft are primary and secondary inverters which are connected to the automatic changeover apparatus to permit the alternative imposition upon said inverters of the D.-C. potential from the main D.-C. source.

The automatic changeover apparatus has incorporated therein means for monitoring the output of the primary and secondary inverters in the present case, phase 1 and phase 2 of three-phase circuits. During the operation of the automatic changeover apparatus, the main D.-C. potential is applied to only one or the other of the inverters by means which will be described in detail below and, during such imposition of the D.-C. potential upon the said one inverter, only the output of that inverter is monitored by the automatic changeover apparatus. However, if the functioning inverter, for any reason, begins to malfunction, the automatic changeover apparatus will both detect the malfunctioning of the inverter and ultimately cause the changeover from the malfunctioning inverter to its associated inverter.

Figure 2:
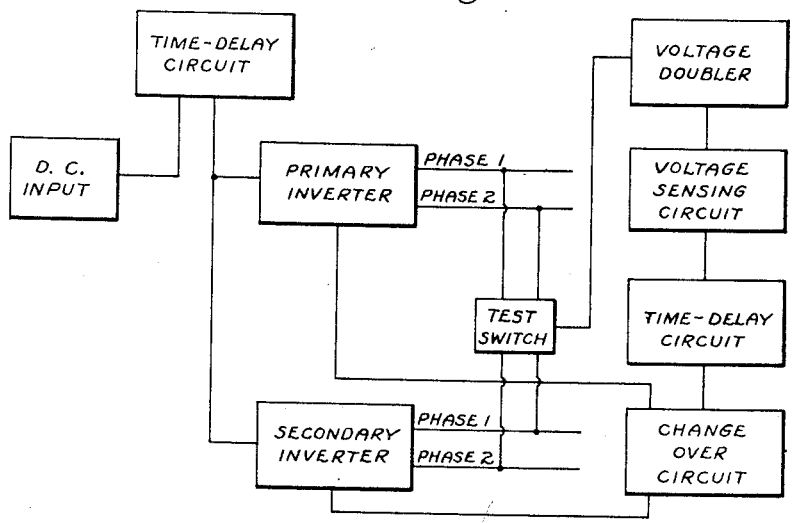
Fig. 2 is a more detailed schematic diagram showing the major components of the changeover apparatus and their relationship with the primary and secondary inverters.

The multiphase automatic changeover apparatus, as best shown in Fig. 2, includes generally an initial time-delay circuit which prevents the immediate energization of the change-over apparatus and thus delays the energization of the primary inverter. When the required time has elapsed, the time delay circuit permits the D.-C. source of potential to be imposed on the primary inverter while the output of the primary inverter is simultaneously imposed on a voltage sensing circuit through a voltage doubler incorporated in the changeover apparatus. The output of the primary inverter is imposed on the voltage sensing circuit through a test switch which can be opened to simulate malfunctioning of the primary inverter to test the automatic changeover apparatus in a manner which will be described in greater detail below.

The voltage sensing circuit governs the operation of a changeover circuit through a time-delay circuit whereby if the initially energized primary inverter should malfunction, the changeover from the primary to the secondary inverter can be automatically accomplished, the time-delay circuit associated with the changeover circuit preventing the immediate transfer from the primary to the secondary inverter, for reasons which have been previously presented.

Figure 4:
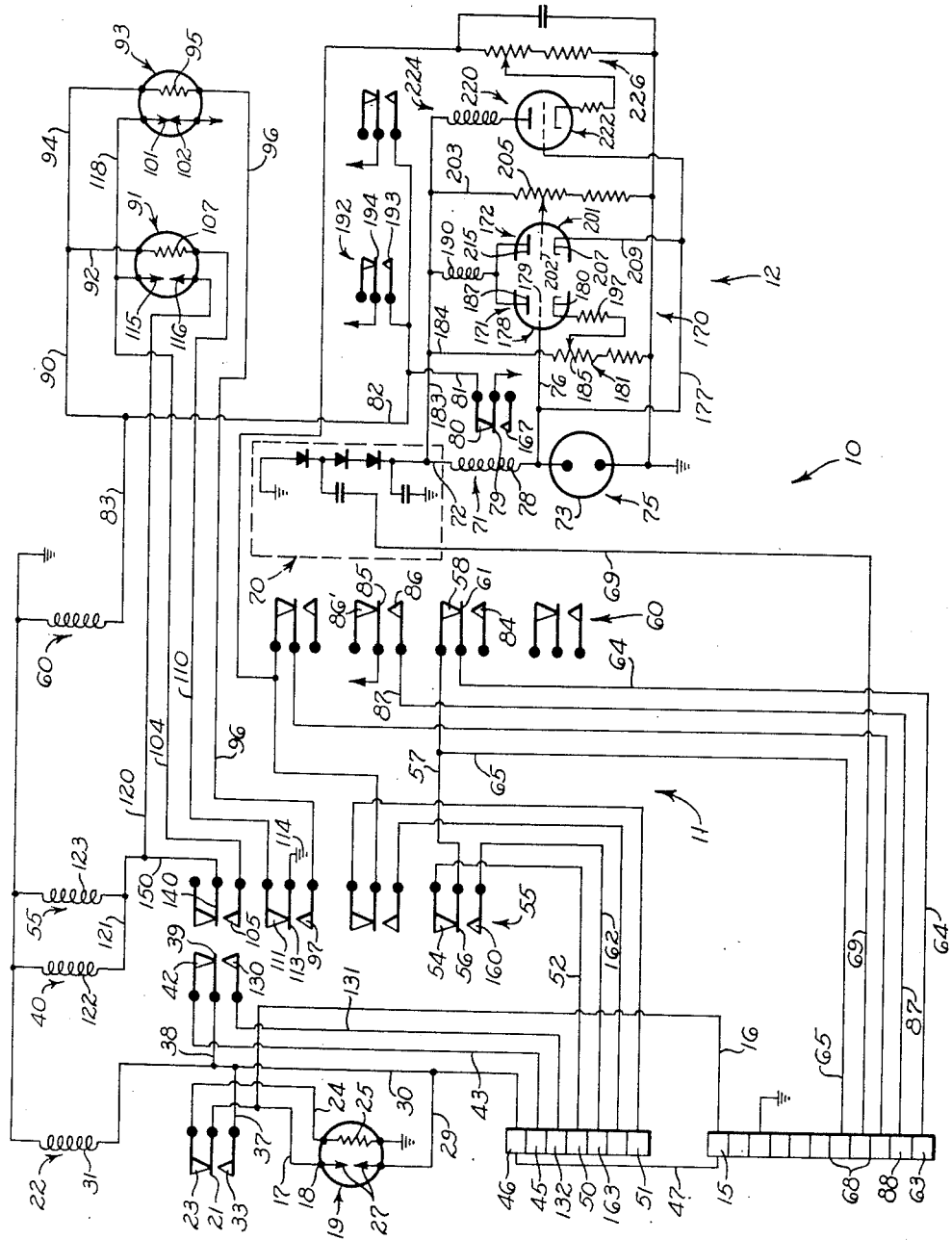
Fig. 4 is a circuit diagram of the multiphase inverter changeover of our invention.

A multiphase automatic changeover apparatus 10, constructed in accordance with our invention, is shown in Fig. 4 of the drawings and is constituted, generally, by a changeover circuit 11 whose energization is controlled by a sensing circuit 12 which monitors the output of primary and secondary inverters, not shown, and which, upon malfunctioning of one of the inverters, causes the various relay circuits incorporated in the changeover circuit 11 to be energized in the appropriate manner. The main 22–30 v. D.-C. input is indicated at 15, said input being connected by a lead 16 to a lead 17, the lead 17 having one end connected, as at 18, to a thermal-delay device 19 and its other end connected to a movable contact 21 of a holding relay 22. The main D.-C. input is usually maintained at 28 v. but the changeover apparatus will recognize as adequate any voltage between 22 and 30 v. D. C.

The contact 21 of the relay 22 is normally closed with a contact 23 of said relay, the contact 23 being connected by a lead 24 to a resistance heater 25 of the thermal-time delay device or unit 19. The thermal-delay device 19 is rated at approximately 70 seconds and thus, before the inverters are energized, a 70 second time lag takes place. The 70 second time lag prevents the operation of the changeover apparatus 10 during the initial operation of the inverter with which it is associated. After 70 seconds have elapsed, the bimetal elements 27 of the thermal-delay unit 19 are closed by the heat from the resistance 25, causing 28 v. current to flow through a lead 29 into a lead 30 which is in series with the coil 31 of the relay 22, energizing the coil 31 and biasing the movable contact 21 of the holding relay 22 into engagement with a contact 33 thereof. When this occurs, the contact 23 of the relay 22 will be de-energized with the concomitant de-energization of the resistance 25 and, consequently, the time-delay device 19.

When the movable contact 21 of the relay 22 makes a circuit with the contact 33 of said relay, 28 v. current flows through a lead 37 into a lead 38 which is connected with the movable contact 39 of a master changeover relay 40, the movable contact being in normally closed position with a contact 42 of the relay 40, said contact 42 being connected to a lead 43 which provides the main 28 v. D.-C. supply for the primary inverter, as indicated at 45.

A bypass switch 46 for the 70 second time-delay circuit discussed above will directly connect the lead 30 and thus the coil 31 of the relay 22 to the main D.-C input at 15 through a lead 47, thus bypassing the thermal-delay device 19 to immediately energize the coil of the relay 22.

The primary inverter converts the 28 v. D.-C. input into three-phase, 400 cycle, 115 v., the third phase of the circuit being grounded while the first and second phase outputs of the primary inverter are indicated at 50 and 51. The current of phase 1 of the primary inverter flows through a lead 52 through a contact 54 of a relay, indicated generally at 55, thence into a movable contact 56 and into a lead 57 which carries phase 1 into a contact 58 of a relay 60, the current flowing into a movable contact 61 and thence into the A.-C output of phase 1 of the automatic inverter changeover apparatus 10 at 63 through a lead 64, the output 63 being connected to instruments or other devices or mechanisms to be energized by 115 v., 400 cycle current.

The lead 57, in addition to applying phase 1 voltage from the inverter output at 50 through the inverter changeover apparatus 10 to the changeover output at 63, is also connected through a lead 65 to a test switch 68, said switch being in series with a lead 69 which imposes phase 1 voltage on a D.-C. voltage doubler, indicated by the box 70. The output of the voltage doubler 70 is connected to a coil 78 of a relay 71 by a lead 72, the other end of which is connected to a voltage regulating tube 73. The relay 71 and the voltage regulator 73 together constitute the initial low voltage sensing or detecting circuit 75 of the invention. The voltage regulating tube 73 is designed so that a minimum predetermined initial voltage is initially required to fire the tube. Therefore, if the phase 1 voltage imposed on the voltage doubler 70 is less than, for example, approximately 50 v. A. C., the voltage regulator tube 73 will not function and sufficient current will not flow through the relay coil 71 to energize it. The coil 78 of the relay 71 will not be energized, thus maintaining a movable contact 79 of said relay in engagement with a contact 80 of said relay. The movable contact 79 is connected to the 28 v. D.-C. input and current flows through the contact 80 through a lead 81 and a lead 82 to a lead 83 connected to the relay 60, which relay is immediately energized to cause the various contacts thereof to be moved from their ordinarily closed positions.

When the relay 60 is energized, the movable contact 61 thereof is moved into contact with a contact 84 thus momentarily, but instantly, disconnecting the phase 1 voltage from the output at 63 to the instruments and the electrically powered facilities of the aircraft. Simultaneously, another movable contact 85 of the relay 60 is moved to make a circuit with a contact 86 thereof which is connected by a lead 87 to a warning light 88 which indicates to the pilot that the primary inverter is malfunctioning. It is apparent, therefore, that the malfunctioning of the primary inverter momentarily interrupts current flow to the main A.-C. phase 1 output 63 to the instruments and powered facilities, thus preventing damage to the instruments and powered facilities during a four second time delay period prior to the automatic changeover from the primary inverter to the secondary inverter.

In addition to energizing the relay 60, the 28 v. D.-C. current flows from the lead 82 into a lead 90, whence it flows into a thermal-delay device 91 connected to the lead 90 by a lead 92 and into a thermal-delay device 93 connected to the lead 90 by a lead 94. It will be noted that the lead 94 is connected to a heater resistance 95 of the thermal-delay device 93 which is in series with a lead 96 connected to a normally open contact 97 of the relay 55. Therefore, when a potential of 28 v. D. C. is applied to the lead 94 from the lead 90, a circuit is not made with the resistance 95 because of the open contact at 97 and normally closed bimetal contacts 101 and 102 of the thermal-delay device 93 remains closed. The bimetal contact 102 is connected to a source of 28 v. D.-C. potential and the other bimetal contact 101 thereof is connected by means of a lead 104 to a normally open contact 105 of the relay 55. Therefore, although the normally closed bimetal contacts 101 and 102 of the thermal-delay device 93 are connected to a 28 v. D.-C. input, the normally open contact 105 prevents the flow of current therethrough.

However, when the 28 v. D. C. is applied to the lead 92 it enters the resistance heating element 107 of the thermal-delay device 91 because a circuit is made through a lead 110 with a normally closed contact 111 of the relay 55 and a movable contact 113 thereof which goes to ground at 114. The making of the circuit through the resistance 107 causes the heating thereof which continues for a period of four seconds to accomplish a four second time delay before normally open bimetal contacts 115 and 116 close. When the normally open bimetal contacts 115 and 116 close, a circuit is made with the source of 28 v. D. C. applied to the lead 104 which connects the bimetal contact 101 of the thermal-delay device 93 with the bimetal contact 115 of the thermal-delay device 91. The 28 v. D. C. is then impressed through a lead 120 and a lead 121 on coils 122 and 123 of the master relay 40 and the relay 55, respectively, to accomplish the energization thereof and to cause the automatic changeover from the primary to the secondary inverter.

Therefore, during the four second time delay caused by the delayed energization of the changeover circuit 11, the primary inverter, if only temporarily malfunctioning, can return to normal output levels and deliver voltages which will prevent a changeover from taking place. In this way the possibility of the rejection of a properly functioning but temporarily aberrant inverter is avoided.

When the relay 40 is energized, the movable contact 39 thereof is urged downwardly into engagement with a contact 130 thereof which is connected by means of a lead 131 to the secondary inverter, 28 v. D.-C. input at 132. Thus, 28 v. D. C. is impressed by the lead 37, the lead 38, the movable contact 39, the contact 130, and the lead 131 onto the D.-C. input of the secondary inverter at 132 and the primary inverter is automatically disconnected from the instruments and/or A.-C. power consumers.

The energization of the relay 55 causes the downward movement of a movable contact 140 of said relay making a circuit with the fixed contact 105 thereof, thus connecting the coils 122 and 123 of the relays 40 and 55 through a lead 150 and the lead 104 and the lead 118 with the 28 v. D.-C. input through the normally closed bimetal contacts 101 and 102 of the thermal-delay device 93. When the coils 122 and 123 of the relays 40 and 55, respectively, are placed in circuit with the 28 v. D.-C. input, they are thus held in energized condition despite the fact that the energization of the relay 55 breaks the contact of the movable member 113 of the relay 55 with the fixed contact 111, thus breaking the 28 v. D.-C. circuit to the resistor 107 of the thermal-delay device 91 and permitting the normally open bimetal contacts 115 and 116 to return to their normally open condition.

Furthermore, the energization of the relay 55 causes the movement of the movable contact 56 of said relay from engagement with the fixed contact 54 thereof into engagement with a paired fixed contact 160 thereof, thus making a circuit through a conductor 162 with the secondary inverter output at 163. After the automatic changeover from the primary to the secondary inverter takes place and the secondary inverter is putting out three-phase, 400 cycle, 115 v., the first phase thereof flows through the lead 57, lead 65, test switch 68, lead 69, and voltage doubler 70. The voltage doubler 70 now, if the secondary inverter is putting out current of voltage over 50 v., will apply a voltage of 100 v., or greater on the voltage regulator tube 73 which is sufficient to discharge the tube and permit the energization of the coil 78 of the relay 71.

When the coil 78 of the relay 71 is thus energized, the movable contact 79 thereof is moved out of engagement with the fixed contact 80 thereof into engagement with a dead contact 167 thereof, thus breaking the 28 v. circuit which would otherwise be made through the leads 81, 82, and 83 to the coil of the relay 60, de-energizing said relay and permitting the movable contact 61 thereof to make the circuit with the fixed contact 58, causing phase 1 of the output of the secondary inverter to flow through the lead 64 to the phase 1 A.-C. output of the automatic changeover apparatus. Simultaneously, the warning light 88 is de-energized by the return of the movable contact 85 of the relay 60 into engagement with a dead contact 86' thereof.

However, although the phase 1 voltage of the circuit may be sufficient to energize the voltage regulator tube 73, it may be either too high or, subsequently to the energization of the tube 73, drop too low to accomplish the proper energization of the instruments powered by the inverter. To overcome this contingency, there is provided a main sensing circuit 170 for phase 1 of the circuit which includes low voltage detecting circuit means 171 and high voltage detecting circuit means 172. It should be explained at this time that the voltage regulator tube 73 regulates the voltage to a standard 108 v. at the lead 76 and a lead 177 connected thereto. The low voltage detecting circuit means 171 of the sensing circuit 170 includes a triode 178 whose grid 179 is maintained at a constant 108 v. by means of the voltage regulator tube 73. The cathode 180 of the triode 178 is connected through a voltage divider 181 to a lead 184 which is connected to the output of the voltage doubler 70 through a lead 183.

The voltage divider 181 which is interposed between the cathode 180 of the triode 178 and the output of the voltage doubler 70 includes a potentiometer 185, which can be adjusted, for a purpose which will be described in greater detail below. The operation of the triode 178 is as follows: When the output of the voltage doubler 70, as imposed on the cathode 180 of the triode 178 through the voltage divider 181, is over 108 v. let us say, 115 v., the cathode 180 is positive with respect to the grid 179 which has imposed thereupon a constant voltage of 108 v. from the voltage regulator 73 and is negative with respect to the cathode 180. Therefore, when the phase 1 voltage is above, for example, 102½ v. A. C. at the input to the voltage doubler, the grid 179 is negative with respect to the cathode 180 and no current flows to the plate 187 of the triode 178. However, when the output of the voltage doubler 70 on the lines 183 and 184 to the voltage divider 181 and thus the cathode 180 falls below some specified voltage characteristic of the requirements of the inverters in the system, the grid 179 becomes more positive with respect to the cathode 180 and the flow of current to the plate 187 of the triode 178 is permitted, thus causing the energization of the coil 190 of a relay 192 to impose 28 v. D. C. on a contact 193 of the relay 192 through a movable contact 194 thereof which is connected to the 28 v. D.-C. source. The contact 193 of the relay 192 is connected to the lead 82 which is connected to the lead 90 which serves the leads 92 and 94 which are disposed in operative relationship with the heating resistors 107 and 95, respectively, of the thermal-delay devices 91 and 93.

For purposes of brevity, the energization of the relays 60, 55 and 40 by the low voltage detecting circuit means 171 will not be described since it is identical with the previously discussed energization thereof when the voltage regulator 73 fails to function due to inadequate voltage imposed thereupon.

However, presuming that the secondary inverter is carrying the load and the output thereof ultimately falls below 92½ v., the low voltage detecting circuit means 171 will be energized causing the grid 179 thereof to become more positive with respect to the cathode 180 and the relay 192 will be energized to impose 28 v. D.-C. potential on the contact 193 of the relay 192 through the movable contact 194. Of course, the impression of 28 v. D. C. across the relay 60 immediately de-energizes the instruments powered by the secondary inverter during the previously discussed four second time delay period. However, the relays 40 and 55 are not de-energized and the automatic changeover from the secondary to the primary inverter is delayed. It will be recalled that the relays 40 and 55 were maintained in energized condition by 28 v. D.-C. potential existing across the thermal-delay device 93 to permit current from the secondary inverter to flow through the automatic changeover device into the instruments and other facilities powered by the system. When 28 v. D. C. is impressed on the lead 82 by the energization of the relay 192, in the above described manner, a circuit is made through the lead 90, the lead 94, and thence into the resistance heating unit 95 of the thermal-delay device 93 to ground at 114 through the lead 96. As previously indicated, the thermal-delay device 93 will delay the automatic changeover from the secondary to the primary inverter until the four second time lag has elapsed. Then, the resistance heater 95 of the time-delay device 93 will cause the opening of the bimetal contacts 101 and 102 which will break the circuit to the relays 40 and 55 and permit them to return to their normally closed positions in which the primary inverter will once again be utilized as a source of power for the instruments.

It will be noted that a statement has been made with regard to the fact that the grid 179 is negative with respect to the cathode 180 when the phase 1 voltage is approximately 102½ v., but will become more positive with respect to the cathode when the phase 1 voltage drops to approximately 92½ v. so that conduction of current through the triode will exist.

The low voltage detecting circuit 171 is so designed that the initial phase 1 voltage must be approximately 102½ v. when the inverter is energized to prevent the low voltage detecting circuit 171 from causing the energization of the relay 192 to accomplish the automatic changeover from the primary to the secondary inverter. However, once the primary inverter has imposed upon the automatic changeover apparatus 10 a phase 1 voltage of approximately 102½ v., the low voltage detecting circuit 171 will not be energized to cause the energization of the relay 192 until the phase 1 voltage falls to approximately 92½ v. This very desirable spread between the initial voltage and the automatic changeover voltage is accomplished by the provision of a resistance 197 in series with the potentiometer 185 of the voltage divider 181. By adjusting the potentiometer 185, the extent of the spread between the initial voltage required to prevent the energization of the low voltage detecting circuit 171 and the drop-out voltage can be regulated and the automatic changeover apparatus can thus be readily utilized in a multiplicity of different applications.

The high voltage detecting circuit means 172 is designed to detect variations in the phase 1 voltage beyond the desired approximately 125 v. The high voltage detecting circuit means 172 is constituted by a triode 201 which includes a grid 202 connected to the voltage doubler output lead 183 by means of a lead 203 and a potentiometer 205. Thus, the bias on the grid 202 of the triode 201 is always a predetermined function of the voltage output of the voltage doubler 70. The cathode 207 of the triode 201 is connected by means of a lead 209 to the lead 177 which has imposed thereupon the 108 v. current regulated by the voltage regulator 73. The potentiometer 205 is so set that the grid bias on the grid 202 is negative with respect to the cathode 207. This condition exists as long as the voltage on the line 183 does not rise to a point which will indicate a concomitant rise in the phase 1 voltage to above 125 v. at the input of the voltage doubler 70. However, when the voltage rises above 125 v., a greater voltage is imposed on the line 183 causing the grid 202 to become more positive with respect to the cathode 207 and permitting current to flow from the plate 215 of the triode 201 into the coil 190 of the relay 192 to cause the energization thereof and 28 v. D. C. to exist at the line 82 to energize the automatic changeover apparatus in the previously described manner. A low voltage detecting circuit 220 is provided for monitoring the low voltage variations of phase 2 of the output of the inverter, the energization and actuation thereof being identical with that of the low voltage detecting circuit 171 of the previously discussed portion of the sensing circuit. The low voltage detecting circuit 220 includes a triode 222 and a relay 224 whose energization is controllable by said triode to accomplish the automatic changeover from one inverter to the other. Associated with the triode 222 is a voltage divider 226 which can be regulated in the same manner as the voltage dividers described heretofore.

Figure 5:
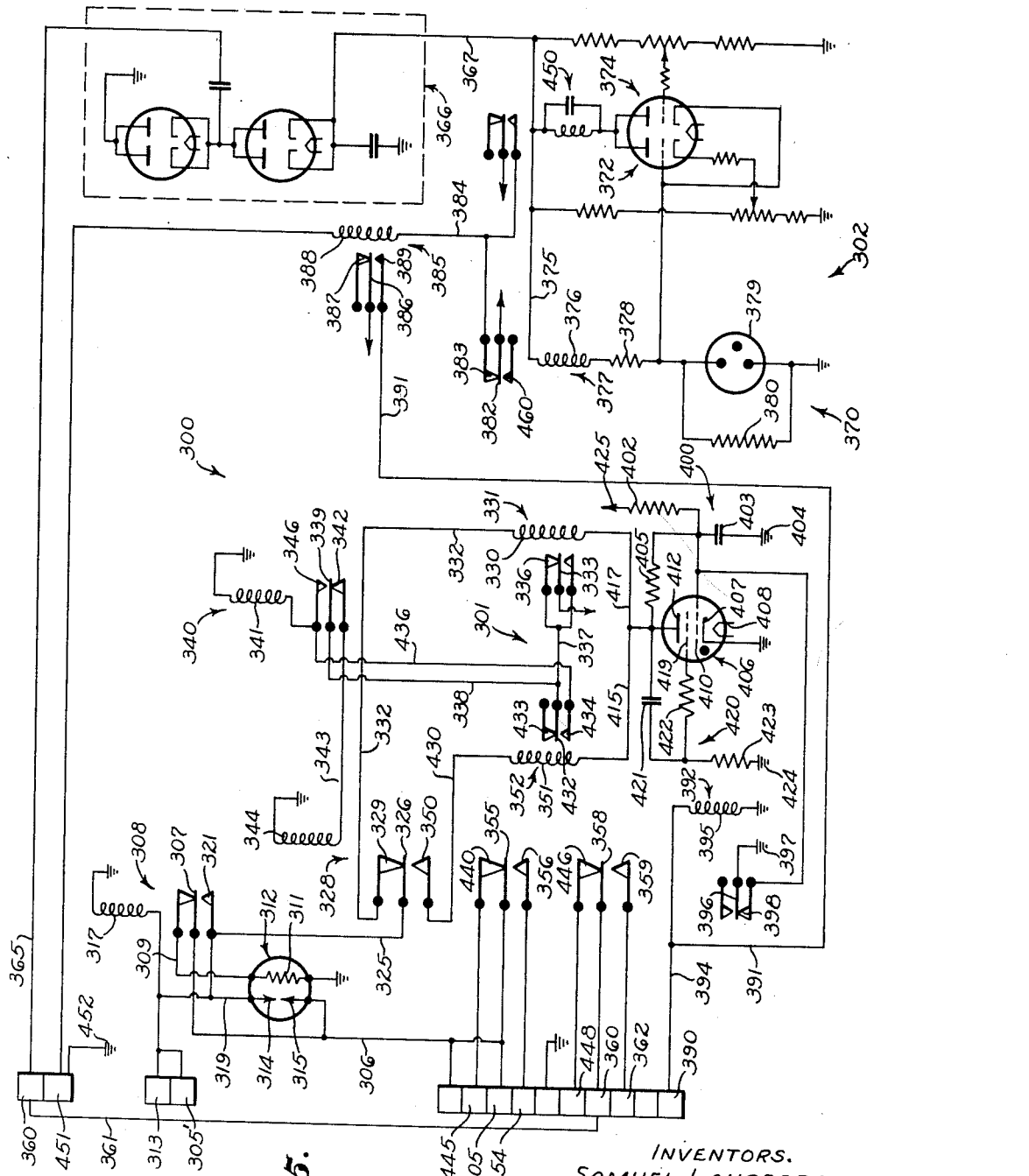
Fig. 5 is a circuit diagram of a single-phase changeover apparatus constructed in accordance with our invention.

Shown in Fig. 5 of the drawings is another embodiment of our invention designed specifically for use with single-phase inverters. In the previously discussed embodiment of our invention, reference was made to the initial 70 second time-delay circuit which is effective simultaneously upon the imposition of the main source of D.-C. potential. However, in the present single-phase system, the 70 second delay is bypassed and the voltage applied to the main inverter upon the throwing of the master D.-C. switch. Also incorporated in the single-phase changeover apparatus is an automatic cut-out which is utilized to de-energize the changeover apparatus during the initiation of operation of certain aircraft equipment so that the changeover apparatus will not respond to severe line voltage drops during periods of time that such line voltage drops must exist. Another difference is that the present changeover will operate satisfactorily under greater variations of temperature, vibration, and shock conditions.

The single-phase changeover apparatus 300 includes primarily a time-delay changeover circuit 301 and a voltage sensing circuit 302. The main D.-C. input 305 is connected by a lead 306 through the normally closed contact 307 of a holding relay 308 to a lead 309 which imposes 22–30 v. D.-C. potential on a heater resistance 311 of a time-delay device 312, said time-delay device having incorporated therein bimetallic elements 314 and 315 which make a circuit after exposure to the heater resistance 311 for a period of 70 (±5) seconds at 24 v. D.-C. When the circuit is made through the bimetallic elements 314 and 315, the coil 317 of the relay 308 is energized through a lead 319 connecting the bimetallic elements 314 and 315 in series with the lead 306 to the direct current source. Upon the energization of the coil 317 of the relay 308, the movable contact 307 thereof is urged downwardly into engagement with a fixed contact 321 of the relay 308, which is thus placed in series with the lead 306, to connect the coil 317 of the relay 308 in series with the source of D.-C. potential at 305 and to break the circuit with the heater resistance 311 thus permitting the time-delay device 312 to return to its normal, de-energized condition and to insure that the coil 317 of the relay 308 will be maintained in energized condition.

A 70 second time-delay bypass is provided at 313 which can be placed directly in circuit with a source of D.-C. potential at 305'. Therefore, should emergency conditions arise which necessitate the immediate operation of the automatic changeover apparatus 300, the bypass 313 can be utilized to impose D.-C. potential on the relay 308 to start the inverter and bypass the time-delay device 312.

A lead 325 connects the fixed contact 321 of the relay 308 to a movable contact 326 of a relay 328 which is normally closed upon a fixed contact 329 of the relay 328 and which is maintained in series with the coil 330 of a relay 331 by means of a lead 332. A movable contact 333 of the relay 331 is connected to a source of D.-C. potential simultaneously with the energization of the main source at 305, thus permitting the D.-C. potential to be imposed upon a fixed contact 336 of the relay 331. The fixed contact 336 of the relay 331 is connected by means of leads 337 and 338 to a movable contact 339 of a relay 340 whose coil 341 is normally de-energized to maintain the movable contact 339 in contact with a fixed contact 342 of said relay which is connected in series by means of a lead 343 to the coil 344 of the relay 328.

Thus, simultaneously with the imposition of D.-C. potential at 305, a circuit is made whereby D.-C. potential is applied to the coil 344 of the relay 328 causing the movable contact 326 to move into engagement with a fixed contact 350 of said relay and, upon energization of the relay 308 the source of D.-C. potential at 305 is placed in series with the coil 351 of a relay 352. It will be noted that the coil 351 of the relay 352 is not energized because it is connected in a normally open circuit, to be described below, which constitutes a portion of the time-delay changeover circuit 301.

Simultaneously, a movable contact 355 of the relay 328 is urged downwardly by the energization of the coil 344 to place the input of the primary inverter at 354 in series with the source of D.-C. potential by engaging a fixed contact 356 of the relay 328. In the same manner, a movable contact 358 of the relay 328 is urged downwardly to engage a fixed contact 359 to place a test switch 360 in series with the A.-C. output of the primary inverter indicated at 362. The component portions of the test switch circuit are connected by a lead 361. Thus, the automatic changeover apparatus automatically brings the primary inverter into operation and will continue to maintain it in operation, regardless of type of operation, for 70 seconds.

The test switch 360 is normally closed to connect the inverter being utilized with the automatic changeover apparatus 300. However, if it is desired to simulate the failure of an inverter to check the operation of the changeover apparatus 300, the test switch 360 is thrown to open the circuit and disconnect the changeover apparatus 300 from the inverter to which it is connected. In a manner to be disclosed in greater detail below, the sensing circuit 302 of the changeover apparatus 300 perceives the simulated failure of the inverter which is in use and automatically performs its function and attempts to change to the standby inverter, giving appropriate warning to the pilot while so doing, in a manner to be disclosed below. For instance, if, as is usually the case, the primary inverter is functioning when the test switch 360 is thrown to open the circuit, the sensing circuit 302 of the changeover apparatus 300 will perceive such open circuit and interpret it as a failure of the main inverter to deliver alternating current at the requisite potential. Upon the perception of such apparent failure of the main inverter by the sensing circuit 302, the automatic changeover circuit 301 will function in an attempt to bring the secondary inverter into play. Of course, since the test switch 360 is open, neither inverter can be connected to the changeover apparatus which will continue to hunt at 4 second intervals at 24 v. D.-C. so long as the test switch is open.

The test switch is connected in series by means of a lead 365 with a voltage doubler indicated generally at 366, the voltage doubler constituting a portion of the automatic changeover apparatus 300 and being connected by means of a lead 367 to the sensing circuit 302. The sensing circuit 302 includes an initial low voltage sensing circuit 370, a low voltage sensing circuit 372, and an extreme high voltage sensing circuit 374. The lead 367 has tapped thereinto a lead 375 which is connected in series with a coil 376 of relay 377 which constitutes a portion of the initial low voltage sensing circuit 370. The coil 376 of the relay 377 is connected through a resistor 378 to a gas-filled voltage regulating tube 379. The relay 377, in conjunction with the voltage regulating tube 379, constitutes the extreme low voltage sensing circuit 370 of the invention. It will be noted that a resistance 380 is connected across the terminals of the tube 379 which allows a D.-C. ground return. The voltage regulating tube 379 is so designed that a predetermined minimum voltage is initially required to fire the tube. Therefore, if the voltage imposed on the voltage doubler 366 by the A.-C. output of the inverter which is connected to the automatic changeover apparatus 300 is less, for example, than approximately 50 v. A. C., the voltage regulating tube 379 will not fire and sufficient current will not flow through the coil 376 of the relay 377 to energize it. Due to the inability of the voltage doubler 366 to impose on the tube 379 sufficient potential to energize the coil 376, a normally closed movable contact 382 of the relay 377, which is connected to a source of D.-C. potential, will remain in contact with a fixed contact 383 of said relay to impose D.-C. potential through a lead 384 on a warning light relay 385. The warning light relay 385 has a movable contact 386 connected to a source of D.-C. potential and normally closed upon a dead fixed contact 387, but upon energization of the coil 388 of the warning light relay 385, the movable contact 386 will make a circuit with a fixed contact 389 thus imposing D.-C. potential on a warning light at 390 which is placed in series with the relay contact 389 through a lead 391. The energization of the warning light 390 will indicate to the pilot that the A.-C. voltage output of the primary inverter is not sufficient and that the secondary inverter will be brought into play by the automatic changeover apparatus 300 if the deficiency exists for four seconds. If the deficiency corrects itself before four seconds, the warning light will go out and a changeover will not occur.

Simultaneously with the energization of the warning light 390, a relay 392 in series with the lead 391 by means of a lead 394 has its coil 395 energized to move the movable contact 396 of said relay which is connected to ground at 397 out of contact with a fixed contact 398 to permit the removal of the entire time-delay and changeover circuit 301 from ground at 397 to accomplish the functioning thereof and thereby shift the load from the primary inverter to the secondary inverter.

Since it is characteristic of inverters that momentary drops in the A. C. output thereof will occur, it is not desirable that the automatic changeover apparatus 300 function instantaneously through the immediate energization of the changeover circuit 301 because a momentary drop in potential would automatically cause the changeover from the primary to secondary inverter when there was no actual necessity for such change. Therefore, there has been incorporated in the automatic changeover circuit 301 a time-delay circuit indicated at 400 and constituted, in part, by a resistance-capacitance network including a resistor 402 and a capacitor 403 in series with each other. The capacitor 403 is connected to ground at 404. A gas filled pentode 406 constitutes a pulse emitting portion of the changeover circuit 301 and includes a cathode 407 provided with a heater filament 408.

The grid 410 of the pentode 406 is connected to the resistance-capacitance network 400 and is adapted to be energized thereby. The plate 412 of the pentode 406 is connected by means of leads 415 and 417, respectively, to the coils 351 and 330 of the relays 352 and 331 so that operation of the pentode will operate one of the relays. A screen grid 419 is interposed between the grid 410 and the plate 412 and is connected to the plate through a regenerative feedback network 420 which includes a capacitor 421, a resistor 422, and a resistor 423 connected to ground at 424. Also connected from the screen grid to the plate 419 is a resistor 405.

When the energization of the warning light relay 385 occurs, due to failure of the primary inverter to energize the initial low voltage detecting circuit 370, as previously indicated, the resistance-capacitance network of the time delay circuit 400, which is connected to a source of D. C. potential 425, is removed from ground at 397 by the energization of the relay 392 to permit the resistance-capacitance network of the time-delay circuit 400 to impose a potential on the grid 410. Because of the commonly known characteristics of such resistance-capacitance networks, and the proper correlatation of the values of the components thereof, a time delay of four seconds occurs at approximately 24 v. D. C. before the grid 410 has sufficient voltage to fire the pentode 406. When the grid 410 is energized by adequate voltage, the gas in the gas-filled pentode 406 ionizes and a pulse is generated at the plate 412 due to the conduction through the pentode.

The pulse on the plate 412 of the pentode 406 is accomplished despite the application of low D.-C. voltages which would ordinarily not fire the pentode 406. This is attributable to the fact that a firing potential sufficient to ionize the gas in the pentode 406 is built up on the grid 410 by means of the resistance-capacitance network 402 and 403. The potential build-up of the aforementioned resistance-capacitance network is coupled to the plate through the resistor 405 and also coupled through a regenerative feedback network constituted by the capacitor 421 and resistances 422 and 423 to the screen grid 419. The cumulative effect of these associated elements of the pentode circuit is to create a pulse at the plate 412 by cooperating in the firing of the pentode 406 of the prescribed time. This is a most important feature of our invention because it permits the utilization of a low potential to energize the changeover circuit 301 to accomplish the automatic changeover from the primary to secondary inverter, or vice versa.

When the potential is imposed on the lead 417 to the coil 330 of the relay 331, the coil 330 is not energized because the lead 332 is connected to the open contact 329 of the relay 308 because of the previous energization of the relay 308 to cause the movable contact 326 thereof to be urged into contact with the fixed contact 350 thereof. However, the imposition of potential on the coil 351 of the relay 352 through the lead 415 results in the energization of the coil 351 because a circuit is made through a lead 430 which connects it to the fixed contact 350 which is, of course, in series with the D.-C. input through the movable contact 326 of the relay 308 and the lead 325 connected thereto.

The energization of the relay 352 causes a movable contact 432 thereof to be moved out of engagement with a dead contact 433 into engagement with a contact 434 thereof. In this manner, 28 v. D.-C. potential is imposed through the movable contact 333 of the relay 331, the fixed contact 336, and the lead 337 on a lead 436, causing the energization of the coil 341 of the relay 340 to urge the movable contact 339 thereof out of engagement with the fixed contact 342 thereof to remove the coil 344 of the relay 328 from the source of direct current potential through the relay 331 and thus de-energize the same, permitting the movable contact 326 of the relay 328 to return to its normally closed position in contact with the fixed contact 329 which is connected by the lead 332 to the coil 330 of the relay 331. Simultaneously, the movable contact 355 of the relay 328 is permitted to return to its normally closed position in contact with a fixed contact 440 whereby the main D.-C. input at 305 is imposed upon the spare inverter at 445. At the same time, the movable contact 358 of the relay 328 is permitted to return to its normally closed position in contact with a fixed contact 446 thereof to place the test switch 360 in circuit with the A.-C. output of the spare inverter at 448.

Because of the de-energization of the relay 328 which permits the movable contacts thereof to return to their normally closed positions, the automatic changeover from the primary to the secondary inverter has been accomplished. However, the de-energization of the relay 328 causes the concomitant de-energization of the coil 351 of the relay 352. Since the energization of the relay 352 was initially responsible for the energization of the coil 341 of the relay 340 to de-energize the relay 328, means must be provided whereby the relay 340 may be maintained in energized condition to prevent the changeover from the functioning secondary inverter to the nonfunctioning primary inverter.

This is accomplished in the following manner: When the coil 341 of the relay 340 was energized by the functioning of the relay 352, the movable contact 339 of the relay 340 engaged a fixed contact 346 of said relay and acts to hold the coil 341 thereof in energized condition by placing the coil 341 in series with a source of D.-C. potential through the movable contact 333 and fixed contact 336 of the relay 331. The fixed contact 333 is connected by leads 337 and 338 to the movable contact 339 of the relay 340.

If the spare inverter is operating properly, the voltage imposed through the voltage doubler 366 is sufficient to energize the voltage regulator tube 379 to energize the coil 376 of the initial low voltage relay 377 to move the movable contact 382 thereof into engagement with a dead contact 460 thereof to de-energize the warning light relay 385 and the associated relay 392, thus simultaneously de-energizing the warning light 390 and returning the movable contact 396 to its normally closed position wherein the resistance-capacitance network of the time-delay circuit 400 is connected to ground. In this manner, until the spare inverter fails to deliver voltage of adequate potential or delivers voltage of excessive potential, the changeover circuit 301 is completely deenergized. However, should the potential imposed on the voltage doubler 366 fall below a predetermined level, the low voltage detecting circuit 372 will be energized in the same manner as the low voltage detecting circuit discussd in the previous embodiment of the invention to actuate a relay 450 and energize the warning light relay 385 and the relay 392 to remove the resistance-capacitance network 400 from ground.

As previously indicated, a four second time delay will result due to the inherent nature of the circuit of the pentode 406. Then, the relay 331 is actuated because the contact 350 connected to the coil 351 of the relay 352 is open and the coil 330 of the relay 331 is connected in series with the main D.-C. source. The energization of the coil 330 will cause the movable contact 333 of the relay 331 to be urged downwardly out of engagement with the contact 336 thus removing the source of D.-C. potential from the coil of the relay 340. In so doing, the contact 339 of the relay 340 disengages the contact 346 and falls back on the contact 342. After the pulse of voltage through the relay 331, contact 333 re-engages the contact 336 and supplies D.-C. potential to the coil 344 of the relay 328, as previously discussed. When the relay 328 is energized, the contacts thereof return to the positions wherein the primary inverter is connected in the circuit and the secondary inverter is returned to standby condition.

During the operation of the aircraft, it frequently happens that various electrical components are suddenly energized, causing a sudden drop in potential throughout the circuits powered by the then functioning inverter. Since it would be undesirable for the time-delay changeover circuit 301 to be energized by such momentary potential drops, we provide automatic changeover disconnect means indicated schematically at 451 and connected to ground at 452. The automatic changeover disconnect means 451 is operatively connected to the coil 388 of the relay 385 whose energization causes the warning light 390 to flash and the beginning of the changeover process.

Normally, the automatic disconnect means 451 is connected to ground at 452 through a relay switch or other conventional means associated with the aforesaid components, not shown, which is normally closed but can be momentarily opened by the energization of said components to break the connection of the coil 388 to ground at 452, thus preventing the energization of the relay 385 and avoiding the temporary removal of the load from the functioning inverter.

Figure 3:
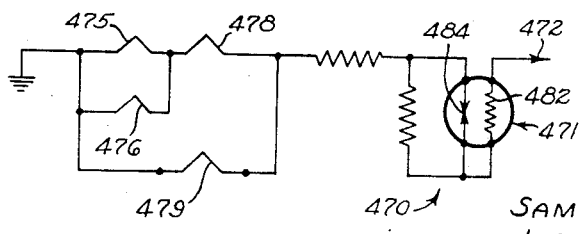
Fig. 3 is a circuit diagram showing the filament heater circuit for the tubes of the sensing circuit of the apparatus.

Shown in Fig. 3 of the drawings is a filament heater voltage regulator 470 which is designed to control the voltages of the filaments utilized in the vacuum tubes incorporated in the changeover apparatus. The filament heater voltage regulator 470 includes a thermo-electric device 471 which is connected at 472 to the source of potential for the filament heaters. The heaters for the voltage doubler tubes are indicated at 475 and 476, while the heater for the tube incorporated in the sensing circuit is indicated at 478. The heater for the pentode 406 is indicated at 479.

The thermoelectric device 471 includes a heating resistor 482 which has associated therewith a pair of separable contacts 484, said contacts being designed to break when the load imposed upon the resistor 482 increases the temperature thereof to a point where possible damage to the heater filaments of the various tubes incorporated in the changeover apparatus might result. When the potential imposed upon the thermoelectric device 471 returns to normal, the heater resistor 482 will cool, permitting the contacts at 484 to make the circuit to the filaments and to impose the potential thereupon.

We thus provide by our invention an automatic changeover apparatus which is characterized by extreme stability of operation and uniformity and preciseness of response to varied conditions. Furthermore, the changeover apparatus, because of its inherent structure, is not readily susceptible to factors which would ordinarily cause extreme variations in the operation thereof, such as moisture and temperature variations. In addition, the changeover apparatus of our invention is relatively simple in construction and inexpensive to manufacture and is sufficiently sturdy to permit it to be utilized under the high G conditions encountered in aircraft.

We claim as our invention:

1. In an automatic changeover apparatus for automatically shifting a load from one to the other of two secondary potential sources, the combination of: a main potential source; means for alternatively imposing the output of said main potential source on either of said two secondary potential sources; a potential sensing circuit; means for alternatively imposing the output of one or the other of said two secondary sources of potential on said sensing circuit; and changeover circuit means responsive to said sensing circuit for shifting said load from one to the other of said two secondary potential sources.

2. In an automatic changeover apparatus for automatically shifting a load from one to the other of two secondary potential sources, the combination of: a main potential source; means for alternatively imposing the output of said main potential source on either of said two secondary potential sources; voltages doubler means; means for alternatively imposing the output of one or the other of said two secondary sources of potential on said voltage doubler means; a potential sensing circuit having the output of said voltage doubler means imposed thereupon; and changeover circuit means responsive to said sensing circuit for shifting said load from one to the other of said two secondary potential sources.

3. In an automatic changeover apparatus for automatically shifting a load from one to the other of two secondary potential sources, the combination of: a main potential source; means for alternatively imposing the output of said main potential source on either of said two secondary potential sources; a potential sensing circuit; means for alternatively imposing the output of one or the other of said two secondary sources of potential on said sensing circuit; and changeover circuit means responsive to said sensing circuit for shifting said load from one to the other of said two secondary potential sources, said changeover circuit means including time-delay means for temporarily delaying the energization of said changeover circuit to prevent the inadvertent energization of said changeover circuit by momentary potential drops in the one of the two secondary potential sources being monitored by said sensing circuit.

4. In an automatic changeover apparatus for automatically shifting a load from one to the other of two secondary potential sources, the combination of: a main potential source; means for alternatively imposing the output of said main potential source on either of said two secondary potential sources; a potential sensing circuit, said sensing circuit including initial low potential detecting means for preventing the initial utilization of one or the other of said two secondary potential sources; means for alternatively imposing the output of one or the other of said two secondary sources of potential on said sensing circuit; and changeover circuit means responsive to said initial low potential detecting means of said sensing circuit for shifting said load from one to the other of said two secondary potential sources.

5. In an automatic changeover apparatus for automatically shifting a load from one to the other of two secondary potential sources, the combination of: a main potential source; means for alternatively imposing the output of said main potential source on either of said two secondary potential sources; a potential sensing circuit, said sensing circuit including low potential detecting means for detecting the failure of one or the other of said two secondary potential sources to deliver minimum potential at the output thereof; means for alternatively imposing the output of one or the other of said two secondary sources of potential on said sensing circuit; and changeover circuit means responsive to said low potential detecting means of said sensing circuit for shifting said load from one to the other of said two secondary potential sources.

6. In an automatic changeover apparatus for automatically shifting a load from one to the other of two secondary potential sources, the combination of: a main potential source; means for alternatively imposing the output of said main potential source on either of said two secondary potential sources; a potential sensing circuit, said sensing circuit including high potential detecting means for detecting the existence of abnormally high potential at the output of one or the other of said two secondary sources of potential; means for alternatively imposing the output of one or the other of said two secondary sources or potential on said sensing circuit; and changeover circuit means responsive to said high potential detecting means of said sensing circuit for shifting said load from one to the other of said two secondary potential sources.

7. In an automatic changeover apparatus for automatically shifting a load from one to the other of two secondary potential sources, the combination of: a main potential source; means for alternatively imposing the output of said main potential source on either of said two secondary potential sources; a potential sensing circuit, said sensing circuit including initial low potential detecting means for preventing the initial utilization of one or the other of said two secondary potential sources and low potential detecting means for detecting the failure of one or the other of said two secondary potential sources to deliver minimum potential at the output thereof; means for alternatively imposing the output of one or the other of said two secondary sources of potential on said sensing circuit; and changeover circuit means responsive to said sensing circuit for shifting said load from one to the other of said two secondary potential sources.

8. In an automatic changeover apparatus for automatically shifting a load from one to the other of two secondary potential sources, the combination of: a main potential source; means for alternatively imposing the output of said main potential source on either of said two secondary potential sources; a potential sensing circuit, said sensing circuit including initial low potential detecting means for preventing the initial utilization of one or the other of said two secondary potential sources and low potential detecting means for detecting the failure of one or the other of said two secondary potential sources to deliver minimum potential at the output thereof, said sensing circuit also including high potential detecting means for detecting the existence of abnormally high potential at the output of one or the other of said two secondary sources of potential; means for alternatively imposing the output of one or the other of said two secondary sources of potential on said sensing circuit; and changeover circuit means responsive to said sensing circuit for shifting said load from one to the other of said two secondary potential sources.

9. In an automatic changeover apparatus for shifting a main source of D.-C. potential to one or the other of two inverters, the combination of: an initial time-delay circuit for preventing the energization of said apparatus for a predetermined time; means energizable by said time-delay circuit for initially imposing potential from said main source on said one inverter; a sensing circuit for monitoring the output of said inverters; means operable simultaneously with the imposition of said main source on said one inverter for imposing the output of said inverter on said sensing circuit; and changeover circuit means responsive to said sensing circuit for shifting said main source from said one to the other inverter when said sensing circuit detects a failure in said one inverter.

10. In an automatic changeover apparatus for shifting a main source of D.-C. potential to one or the other of two inverters, the combination of: means for initially imposing potential from said main source on said one inverter; a sensing circuit for monitoring the output of said inverters; means operable simultaneously with the imposition of said main source on said one inverter for imposing the output of said inverter on said sensing circuit; and changeover circuit means responsive to said sensing circuit for shifting said main source from said one to the other inverter when said sensing circuit detects a failure in said one inverter, said changeover circuit incorporating time-delay means for delaying the energization thereof to prevent momentary failure of said one inverter from causing a changeover from said one to the other inverter.

11. In an automatic changeover apparatus for shifting a main source of D.-C. potential to one or the other of two inverters, the combination of: means for initially imposing potential from said main source on said one inverter; a sensing circuit for monitoring the output of said inverters; means operable simultaneously with the imposition of said main source on said one inverter for imposing the output of said inverter on said sensing circuit; and changeover circuit means responsive to said sensing circuit for shifting said main source from said one to the other inverter when said sensing circuit detects a failure in said one inverter, said changeover circuit incorporating thermoelectric time-delay means for delaying the energization thereof to prevent momentary failure of said one inverter from causing a changeover from said one to the other inverter.

12. In an automatic changeover apparatus for shifting a main source of D.-C. potential to one or the other of two inverters, the combination of: means for initially imposing potential from said main source on said one inverter; a sensing circuit for monitoring the output of said inverters, said sensing circuit including initial low potential detecting means for preventing the initial continued operation of said one inverter; means operable simultaneously with the imposition of said main source on said one inverter for imposing the output of said inverter on said sensing circuit; and changeover circuit means responsive to said sensing circuit for shifting said main source from said one to the other inverter when said sensing circuit detects a failure in said one inverter.

13. In an automatic changeover apparatus for shifting a main source of D.-C. potential to one or the other of two inverters, the combination of: means for initially imposing potential from said main source on said one inverter; a sensing circuit for monitoring the output of said inverters, said sensing circuit including low voltage detecting means and high voltage detecting means for respectively detecting variations in the output of said one inverter below or above a predetermined minimum or maximum output; means operable simultaneously with the imposition of said main source on said one inverter for imposing the output of said inverter on said sensing circuit; and changeover circuit means responsive to said sensing circuit for shifting said main source from said one to the other inverter when said sensing circuit detects a failure in said one inverter.

14. In an automatic changeover apparatus for alternatively impressing a D.-C. potential on the input of one or the other of two inverters, the combination of: self-energizable means for initially impressing said D.-C. potential on the input of said one inverter; a voltage doubler; means operable simultaneously with the impressing of said D.-C. potential on said one inverter for impressing the output of said one inverter on said voltage doubler; a sensing circuit in series with said voltage doubler, said sensing circuit including initial low, low and high potential detecting means for detecting variations in the output of said one inverter below or beyond predetermined norms; and changeover circuit means responsive to said sensing circuit for shifting said D.-C. potential from said one to the other of said two inverters.

15. In an automatic changeover apparatus for alternatively impressing a D.-C. potential on the input of one or the other of two inverters, the combination of: initial time-delay means for momentarily delaying the energization of said apparatus; self-energizable means for initially impressing said D.-C. potential on the input of said one inverter; a sensing circuit including initial low, low and high potential detecting means for detecting variations in the output of said one inverter below or beyond predetermined norms; means operable simultaneously with the impressing of said D.-C. potential on said one inverter for impressing the output of said one inverter on said sensing circuit; and changeover circuit means responsive to said sensing circuit for shifting said D.-C. potential from said one to the other of said two inverters.

16. In an automatic changeover apparatus for alternatively impressing a D.-C. potential on the input of one or the other of two inverters, the combination of: self-energizable means for initially impressing said D.-C. potential on the input of said one inverter; a sensing circuit including initial low, low and high potential detecting means for detecting variations in the output of said one inverter below or beyond predetermined norms; means operable simultaneously with the impressing of said D.-C. potential on said one inverter for impressing the output of said one inverter on said sensing circuit; and changeover circuit means responsive to said sensing circuit for shifting said D.-C. potential from said one to the other of said two inverters, said changeover circuit means including time-delay means constituted by a pulse forming member included in a resistance-capacitance network.

17. In an automatic changeover apparatus for alternatively impressing a D.-C. potential on the input of one or the other of two inverters, the combination of: self-energizable means for initially impressing said D.-C. potential on the input of said one inverter; a sensing circuit including initital low, low and high potential detecting means for detecting variations in the output of said one inverter below or beyond predetermined norms, said low and high potential detecting means including adjustment means for respectively varying the minimum and maximum norms to which they are responsive; means operable simultaneously with the impressing of said D.-C. potential on said one inverter for impressing the output of said one inverter on said sensing circuit; and change-over circuit means responsive to said sensing circuit for shifting said D.-C. potential from said one to the other of said two inverters.

18. In an automatic changeover apparatus for alternatively impressing a D.-C. potential on the input of one or the other of two inverters, the combination of: self-energizable means for initially impressing said D.-C. potential on the input of said one inverter; a sensing circuit including initial low, low and high potential detecting means for detecting variations in the output of said one inverter below or beyond predetermined norms; means operable simultaneously with the impressing of said D.-C. potential on said one inverter for impressing the output of said one inverter on said sensing circuit; a test switch for voluntarily isolating said sensing circuit from said inverter outputs to simulate the failure of said one or the other of said inverters; and changeover circuit means responsive to said sensing circuit for shifting said D.-C. potential from said one to the other of said two inverters.

19. An automatic changeover apparatus as described in claim 10, including means operable with the imposition of said main source on said one inverter for imposing the output of said inverter on a load, said changeover circuit means incorporating switch means for removing said load from said one inverter when said sensing circuit detects said failure.

20. An automatic changeover apparatus as defined in claim 10, in which said time-delay means includes a gas tube having at least two control elements, a pulse-forming resistance-capacitance network connected to one of said control elements, and a regenerative feedback resistance-capacitance network connected to another of said control elements.

21. An automatic changeover apparatus as defined in claim 15, in which said sensing circuit includes a switching means and two amplifier means, each of said amplifier means having an output element and first and second control elements, each of said output elements being coupled to said output of said one inverter through said switching means, said first control element of one of said amplifier means and said second control element of the other of said amplifier means being connected to a source of reference potential, said second control element of said one amplifier means and said first control element of said other amplifier means being respectively connected to predetermined portions of said output of said one inverter.

22. An automatic changeover apparatus as defined in claim 15, in which one of said low potential detecting means includes adjustment means for changing the predetermined norm associated therewith, said last mentioned predetermined norm being variable over a range including the predetermined norm associated with said other low potential detecting means.

References Cited in the file of this patent
UNITED STATES PATENTS

| | | |
|---|---|---|
| 2,263,320 | Truckses | Nov. 18, 1941 |
| 2,631,248 | Gottman | Mar. 10, 1953 |
| 2,683,818 | Smith | July 13, 1954 |